United States Patent Office 2,820,785
Patented Jan. 21, 1958

2,820,785
MONOAZO-DYESTUFFS

Heinrich Zollinger, Binningen, and Alfred Fasciati, Bottmingen, Switzerland, assignors to Ciba Limited, Basel, Switzerland, a Swiss firm No Drawing. Application August 9, 1954
Serial No. 448,738
Claims priority, application Switzerland August 19, 1953
10 Claims. (Cl. 260—153)

This invention provides monoazo-dyestuffs which, like the product of the formula (1)

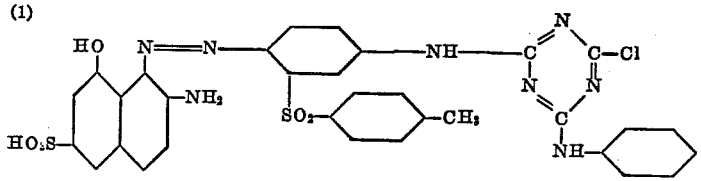

correspond to the general formula (2)         R—N=N—R$_1$—X in which R represents the radical of an aminonaphthalene sulfonic acid bound to the azo linkage in a position vicinal to the amino group, R$_1$ represents the radical of a diazo component of the benzene series, X represents a heterocyclic radical having no dyestuff character and bound to R$_1$ through a nitrogen bridge, and which radical contains a reactive halogen atom and a single heterocyclic ring.

The invention also includes a process for making the aforesaid monoazo-dyestuffs, wherein an aminonaphthalene sulfonic acid (such as 2-aminonaphthalene-3:6- or 3:7-disulfonic acid, 2-amino-8-hydroxynaphthalene-3:6-disulfonic acid, and especially aminonaphthalene monosulfonic acids such as 2-amino-3- or -5-hydroxynaphthalene-7-sulfonic acid, 2-amino-7-hydroxynaphthalene-4-sulfonic acid, 2-aminonaphthalene-6-, -7- or -8-sulfonic acid, 2-alkylamino- or 2-arylamino-8-hydroxynaphthalene-6-sulfonic acids, for example, 2-methylamino-, 2-β-hydroxyethylamino- or 2-phenylamino-8-hydroxynaphthalene-6-sulfonic acid, and especially 2-amino-8-hydroxynaphthalene-6-sulfonic acid itself) is coupled in an acid medium with a diazo compound of the formula (3)         H$_2$N—R$_1$—X in which R$_1$ and X have the meanings given above in connection with Formula 2.

The amines of the Formula 3, which are used as starting materials in the present process, can be prepared by methods in themselves known, for example, by condensing 1 molecular proportion of an amine which contains in addition to the diazotizable amino group, a reactive hydrogen atom bound to a nitrogen atom, with 1 molecular proportion of a heterocyclic halogen-compound having no dyestuff character, which contains a single heterocyclic ring and at least two reactive halogen atoms, for example with 1 molecular proportion of α:γ-dichloroquinoline, 1:4-dichlorophthalazine, methyldichloropyrimidine, 2:4-dichloroquinazoline, 2:4:7-trichloroquinazoline, trichloro- or tribromo-pyrimidine, 2:4-dichloropyrimidine and above all 2:4:6-trichloro-1:3:5-triazine or with 1 molecular proportion of a cyanuric halide of the formula (4)

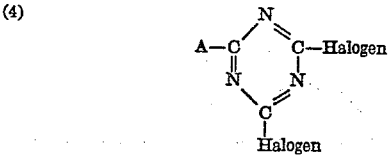

in which A represents an aliphatic, alicyclic, araliphatic or aromatic radical advantageously containing at most 12 carbon atoms and bound to the triazine nucleus through an oxygen, sulfur or nitrogen bridge.

Thus, diazo-compounds which contain a cyanuric acid radical and are especially valuable for the present process, are obtainable, for example from diamines of the benzene series by reacting the diamine with 1 molecular proportion of cyanuric chloride, and in the resulting primary condensation product exchanging a remaining chlorine atom for the radical of an aliphatic, alicyclic, araliphatic or aromatic compound advantageously containing at most 12 carbon atoms and containing a reactive hydrogen atom. As compounds containing at most 12 carbon atoms there come into consideration, for example, ammonia, aliphatic or aromatic hydroxy compounds, mercaptans, and above all organic nitrogen compounds such as amines, amides, amino-alcohols, amino-acids, urethanes and the like. It is of advantage, however, to carry out the condensation with these compounds first, whereby a cyanuric halide of the Formula 4 is formed, which is simultaneously or subsequently condensed with 1 molecular proportion of the diamine.

It is often of advantage to use as starting materials monamino- or monhydroxy-benzenes which contain a substituent convertible into an amino group (for example a nitro or acylamino group), and, after the condensation with the cyanuric halide, to convert the latter substituent into an amino group, for example, by reduction or hydrolysis. As such monamino- or monhydroxy-benzenes there come into consideration, for example, 3- or 4-formylamino-1-aminobenzene.

The condensation with the cyanuric halide is advantageously carried out in the presence of an acid-binding agent such as sodium carbonate. In this condensation it will be understood that it must be carried out so that at least one exchangeable halogen atom remains in the finished product.

As examples of amines obtainable as described above, and of which the diazo-compounds are used as starting materials in the present process, there may be mentioned: The condensation product from 1 mol of 2:4-dichloroquinazoline and 1 mol of 1:4 diaminobenzene-2-sulfonic acid, a condensation product from 1 mol of 2:4-dichloroquinazoline and 1 mol of 2:5-diaminobenzene-1-sulfonic acid-N-ethyl-anilide or 1 mol of 2:5-diamino-1:1'-diphenylsulfone.

Especially valuable monoazo-dyestuffs are obtained with secondary condensation products from 1 mol of any one of the following diamines:

1:4-diaminobenzene-2-sulfonic acid, 1:3-diaminobenzene-4-sulfonic acid, 1:3- or 1:4-diaminobenzene, 4:4'-diaminodiphenylmethane, 4:4' - dimethyl-3:3'-diaminodiphenylmethane, 4:4'-diaminodiphenyl, 4:4'- or 2:4'-diaminodiphenyl ether, 4:4'-dichloro-2:2'-diaminodiphenyl ether, 4:4'- or 2:2'-diaminodiphenylsulfide, 4:4'- or 3:3'-diaminodiphenyl sulfone, 2:5-diaminobenzene-1-methyl sulfone, 2:5-diaminobenzene-1-ethyl sulfone, 2:5-diamino-4'-methoxy-1:1'-diphenyl sulfone, 2:5-diamino-4'-methyl-1:1'-diphenyl sulfone, 2:5-diamino-1:1'-diphenylsulfone, 2:5-diaminobenzene-1-sulfonic acid amide, 2:5-diaminobenzene-1-sulfonic acid methyl-, -ethyl, -phenyl- or -paratolylamide, 2:5-diaminobenzene-1-sulfonic acid dimethyl- or -diethylamide, 2:5-diaminobenzene-1-sulfonic acid cyclohexylamide, 2:5-diaminobenzene - 1 - sulfonic acid-N-methyl- or -ethylanilide, with 1 mol of a primary condensation product from cyanuric chloride and 1 mol of one of the following compounds: Alcohols and phenols such as methyl alcohol, ethyl alcohol or butyl alcohol, phenol, ortho-, meta- or para-cresol, 4-secondary butyl-phenol, 4-tertiary amyl-phenol, dialkylphenols, para-chlorophenol, methylamine, dimethylamine, ethylamine, diethylamine, isopropylamine, butylamine, hexylamine, phenylamine, tolylamine, 4-chlorophenylamine, N-methyl-phenylamine or cyclohexylamine, or of an ethanolamine, acetamide, butyric acid amide, urea, thiourea, toluene sulfonamide, glycocoll, aminocarbonic acid esters such as the methyl or ethyl ester, ethylaminoacetate, aminoacetamide, 1- or 2-aminonaphthalene-4- or -6-sulfonic acid, 1-aminobenzene-3- or -4-sulfonic acid, or the sulfonamides or sulfones of these acids.

The amines used as starting materials in the present process can be diazotized by methods in themselves known, for example, with the aid of mineral acids, especially hydrochloric acid and sodium nitrite, or by one of the usual methods applicable to compounds which are difficult to diazotize, for example, with the aid of nitrosyl-sulfuric acid. In the latter case it is often of advantage to precipitate the diazo-compound, for example, by dilution of the diazotization mixture with water, filtering off the precipitated diazo-compound, and then coupling with the 2-aminonaphthalene sulfonic acid. The coupling is carried out in an acid medium, for example, an acetic acid medium or a medium rendered weakly acid to Congo. For this purpose, for example, a 2-aminonaphthalene sulfonic acid may first be converted into an alkali salt, reconverted into the free acid by the addition of acetic acid, whereby a suspension is obtained, and then coupling the filtered-off diazo compound with this suspension. The free mineral acid liberated during the coupling reaction is then neutralized, for example, with sodium acetate and if desired, the temperature is raised somewhat.

The isolation of the dyestuff from the coupling mixture is carried out in such manner that the isolated product still contains a reactive halogen atom. For this purpose there is added to the coupling mixture, for example, sodium carbonate or sodium chloride, and the precipitated dyestuff is filtered off and dried.

The new dyestuffs of the general Formula 2 can also be made by a modification of the above process, wherein 1 molecular proportion of a monoazo-dyestuff of the formula (5) $R—N=N—R_1—Z$ in which R represents the radical of an aminonaphthalene sulfonic acid bound to the azo linkage in a position vicinal to the amino group, $R_1$ represents the radical of a diazo component of the benzene series, and Z represents an amino group containing at least one reactive hydrogen atom, is condensed with 1 molecular proportion of a heterocyclic halogen-compound which contains a single heterocyclic ring and at least two exchangeable halogen atoms, and, if the resulting product contains two exchangeable halogen atoms, exchanging one of these halogen atoms by condensation with an aliphatic, cycloaliphatic, araliphatic or aromatic compound which contains a reactive hydrogen atom.

The monoazo dyestuffs of the Formula 5 used as starting materials can be made by methods in themselves known by coupling one of the aminoaphthalene sulfonic acids mentioned above in an acid medium with a diazo compound, which contains, in addition to the diazo group, a free amino group or a substituent convertible into a free amino group, such substituent being so converted after the coupling reaction.

As examples of such diazo-compounds there may be mentioned those obtainable from the following amines: 3- or 4-nitro-1-aminobenzene, 4-nitro-4'-aminodiphenyl and the diamines mentioned above or their monoacyl compounds.

The condensation of the monoazo dyestuffs of the Formula 5 so obtained with the heterocyclic halogen-compounds which contain a single heterocyclic ring and at least two halogen atoms, and of which the more easily accessible examples are mentioned above, is advantageously carried out in the presence of an acid-binding agent such as sodium acetate and under conditions such that the resulting dyestuff condensation product contains a reactive halogen atom, that is to say, for example, in an organic medium or in an aqueous medium at as low a temperature as possible.

The new dyestuffs of this invention are suitable for dyeing and printing a very wide variety of materials, especially those of animal origin, such as leather, silk and above all wool, and also various artificial fibers, for example, animalized artificial silk, superpolyamides or superpolyurethanes, etc. The dyeings and prints obtainable with these dyestuffs, especially those which contain only one sulfonic acid group and a single halogen atom, are distinguished by their valuable tints, their level character and their good fastness to washing and fulling, especially in the alkaline region.

The following examples illustrate the invention, the parts and percentages being by weight unless otherwise stated, and the relationship of parts by weight to parts by volume being the same as that of the kilogram to the liter:

*Example 1*

39.3 parts of the secondary condensation product from 1 mol of cyanuric chloride, 1 mol of aniline and 1 mol of 1:3-diaminobenzene-4-sulfonic acid are suspended in 300 parts of water and 20 parts of hydrochloric acid of 30 percent strength and diazotized at about 10–15° with 25 parts by volume of a 4N-solution of sodium nitrite. The resulting slightly yellowish diazo-suspension is mixed with 30 parts of sodium acetate ($CH_3COONa.3H_2O$) and then at 20–25° C. with a solution rendered acid with acetic acid of the sodium salt of 23.9 parts of 2-amino-8-hydroxynapthalene-6-sulfonic acid in 200 parts of water. When the coupling is finished the suspension is rendered weakly alkaline to litmus with sodium carbonate solution, salted out and filtered off. There is obtained a dyestuff which dyes wool from sulfuric acid or acetic acid baths red tints of excellent fastness to light and good properties of wet fastness.

By using instead of the condensation product from equivalent parts of cyanuric chloride, aniline and 1:3-diaminobenzene-4-sulfonic acid, the condensation product from cyanuric chloride, aniline and 1:4-diaminobenzene-2-sulfonic acid, there is obtained a dyestuff yielding somewhat more bluish shades and having similar properties of fastness.

*Example 2*

54.2 parts of the dyestuff 4-amino-2-(N-ethyl-N-phenyl)-sulfonamido-benzene-1:1'-azo-2'-amino-8'-hydroxy-naphthalene-6'-sulfonic acid of the formula

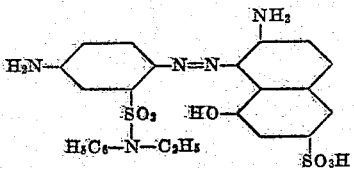

are dissolved in the form of the sodium salt in 2000 parts of water. 27 parts of 2-anilino-4:6-dichlorotriazine of the formula

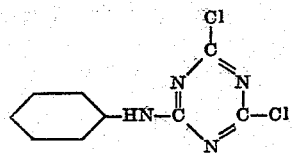

are added at 35–45° C. The whole is stirred at that temperature for 4–6 hours, and the mineral acid formed is neutralized with a solution of sodium carbonate or sodium acetate. When the condensation is finished, the dyestuff is salted out with sodium chloride, filtered off and dried. It dyes wool from weakly acid or neutral baths bluish red tints which are distinguished by their good fastness to light and properties of wet fastness.

The same dyestuff is obtained by reacting 1:4-diaminobenzene-2-sulfonic acid-(N-ethylphenyl)-amide with an equivalent quantity of 2-anilino-4:6-dichloro-triazine, diazotizing the resulting amino compound containing a free amino group in the 1-position, and coupling the diazo compound with 2-amino-8-hydroxynaphthalene-6-sulfonic acid in a weakly acid medium.

Similar dyestuffs are obtained by using, instead of the condensation product from cyanuric chloride, aniline, and 1:4-diaminobenzene-2-sulfonic acid-N-ethylphenylamide, the condensation products mentioned in column I, and using the same coupling component. In column III are given the tints obtainable on wool.

| | I<br>Diazo-components | II<br>Coupling components | III<br>Tints of dyeings |
|---|---|---|---|
| 1 | (structure) | 2-amino-8-hydroxy-naphthalene-6-sulfonic acid. | Bluish red. |
| 2 | (structure) | do | Do. |
| 3 | (structure) | do | Do. |
| 4 | (structure) | do | Do. |
| 5 | (structure) | do | Do. |
| 6 | (structure) | do | Red. |

| | I<br>Diazo-components | II<br>Coupling components | III<br>Tints of dyeings |
|---|---|---|---|
| 7 | (structure: chlorotriazine with NH-phenyl and NH-phenyl-SO₂-CH₃-NH₂) | do | Do. |
| 8 | (structure: chlorotriazine with NH-chlorophenyl and NH-phenyl with NH₂, SO₂-N(C₂H₅)-phenyl) | do | Do. |
| 9 | (structure: chlorotriazine with NH-methylphenyl and NH-phenyl with NH₂, SO₂-N(C₂H₅)-phenyl) | do | Do. |
| 10 | (structure: chlorotriazine with NH-methoxyphenyl and NH-phenyl with NH₂, SO₂-N(C₂H₅)-phenyl) | do | Bluish red. |
| 11 | (structure: chlorotriazine with NH-phenyl-OCH₃ and NH-phenyl with NH₂, SO₂-N(C₂H₅)-phenyl) | do | Do. |
| 12 | (structure: chlorotriazine with NH-phenyl-CH₃ and NH-phenyl with NH₂, SO₂-N(C₂H₅)-phenyl) | do | Do. |
| 13 | (structure: chlorotriazine with OCH₃, NH-phenyl and NH-phenyl with NH₂, SO₂-phenyl-CH₃) | do | Red. |

| | I<br>Diazo-components | II<br>Coupling components | III<br>Tints of dyeings |
|---|---|---|---|
| 14 | [structure: Cl—C, N, C—NH—phenyl—NH$_2$ / phenyl—SO$_2$—N—C$_2$H$_5$ / N, C, O—phenyl] | ...do... | Yellowish red. |
| 15 | Condensation product of cyanuric chloride, N-methyl aniline and 2:5-diaminobenzene-1-sulfonic acid N-ethylanilide. | ...do... | Red. |

Example 3

44.5 parts of the condensation product from 1 mol of cyanuric chloride, 1 mol of monomethylamine and 1 mol of 2:5-diaminobenzene-1-sulfonic acid - N - ethylphenylamide are stirred in 300 parts of an aqueous sulfuric acid which contains 10 percent of H$_2$SO$_4$ and a quantity of a commercial naphthalene mono- or -poly-sulfonic acid sufficient for partial dissolution of the diazo-component. An aqueous solution of 6.9 parts of sodium nitrite is added dropwise to the suspension slowly while stirring. The resulting diazo-compound is in part dissolved.

After any excess of nitrous acid has been decomposed with urea, there is added a neutral suspension of 22.3 parts of 2-aminonaphthalene-6-sulfonic acid and the necessary quantity of sodium carbonate in 50 parts of water, and the mineral acid is neutralized by the addition of sodium acetate until Congo paper no longer turns blue. In order to accelerate the coupling the reaction mixture may be warmed to a temperature of about 50° C. When the coupling is finished, the mixture is neutralized by the addition of sodium carbonate. The precipitated red-brown dyestuff is filtered off in the usual manner and dried. The dyestuff so obtained dyes wool from acetic acid baths reddish orange tints which are fast to light.

A dyestuff, which dyes wool somewhat less reddish orange tints, is obtained by using, instead of 2-aminonaphthalene-6-sulfonic acid, 22.3 parts of 2-aminonaphthalene-8-sulfonic acid.

By using for coupling with the same diazo-compound 25.3 parts of 2-methylamino-8-hydroxynaphthalene-6-sulfonic acid there is obtained a dyestuff which dyes wool violet tints which are fast to light.

Example 4

48.1 parts of the condensation product from 1 mol of cyanuric chloride, 1 mol of aniline and 1 mol of 2-amino-5-methylamino-4'-methyl-diphenyl sulfone are stirred in 300 parts of aqueous sulfuric acid which contains 10 parts of H$_2$SO$_4$ and also a quantity of a commercial naphthalenemono- or -poly-sulfonic acid sufficient only for partial dissolution of the diazo-component. An aqueous solution of 6.9 parts of sodium nitrite is added dropwise slowly to the mixture while stirring.

When the diazotization is finished, any excess of nitrous acid is decomposed, and a weakly acid suspension of 23.9 parts of 2-amino-8-hydroxynaphthalene-6-sulfonic acid in 50 parts of water, is added. By the addition of the necessary quantity of sodium acetate the mixture is maintained at a pH value between 2.0 and 4.0. When the coupling is finished, the mixture is neutralized by the addition of sodium carbonate, and the dyestuff is salted out in the usual manner and isolated. It is a dark red-brown powder which dyes wool from acetic acid baths bluish red tints which are fast to light.

The 2-amino-5-methylamino-4'-methyl-diphenylsulfone necessary for the diazo-component can be prepared in known manner by reacting 2:5-diamino-4'-methyl-diphenylsulfone with an equivalent quantity of a methyl halide, for example methyl iodide.

Example 5

In a manner analogous to that described in Example 4, the diazo-compound obtained from 37.5 parts of the condensation product from 1 mol of 2:5-diamino-4'-methyl-diphenylsulfone and 1 mol of 2:4-dichloropyrimidine is coupled with 23.9 parts of 2-amino-8-hydroxynaphthalene-6-sulfonic acid in an acid medium.

The dyestuff so obtained dyes wool from acetic acid baths distinctly more yellowish tints than those of the dyestuffs described in Examples 2 and 4 prepared with diazo-compounds derived from 2:5-diamino-4'-methyl-diphenylsulfone.

Example 6

2 parts of the dyestuff obtained as described in Example 2 are dissolved in 4000 parts of water, 10 parts of crystalline sodium sulfate are added to the dyebath, and 100 parts of wool are entered at 40–50° C., 2 parts of acetic acid of 40 percent strength are then added, the temperature is raised to the boil in the course of ½ hour and dyeing is carried on at that temperature for ¾ hour. By rinsing and drying the material there is obtained a blue-red dyeing which is fast to light, and possesses very good fastness to washing and fulling.

What is claimed is:

1. A monoazo dyestuff of the formula

R—N=N—R$_1$—X in which R represents the radical of an aminonaphthalene monosulfonic acid bound to the azo linkage in a position vicinal to the amino group, R$_1$ represents the radical of a diazo component of the benzene series free from sulfonic and carboxylic acid groups, and X represents a triazine radical bound through a nitrogen bridge to R$_1$ and which contains an exchangeable chlorine atom and, as single heterocyclic ring, the ring of the said triazine radical.

2. A monoazo dyestuff which contains a single free sulfonic acid group and corresponds to the formula

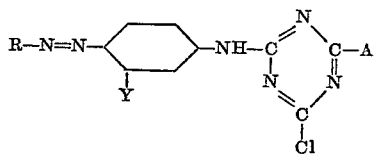

in which R represents the radical of a 2-aminonaphthalene monosulfonic acid bound to the azo linkage in 1-position, Y represents a member of the group consisting of a sulfone and a sulfonic acid amide group, and A represents a member of the group consisting of a hydrogen atom, a benzene radical and an alkyl radical of at most 12 carbon atoms bound to the triazine nucleus through a nitrogen bridge of the formula

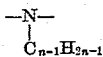

wherein $n$ is a whole number up to and including 2.

3. A monoazo dyestuff which contains a single free sulfonic acid group and corresponds to the formula

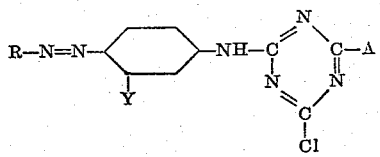

in which R represents a radical of a 2-aminonaphthalene monosulfonic acid bound to the azo linkage in 1-position, Y represents a sulfonic acid amide group and A represents a benzene radical bound to the triazine nucleus through an —NH— group.

4. A monoazo dyestuff of the formula

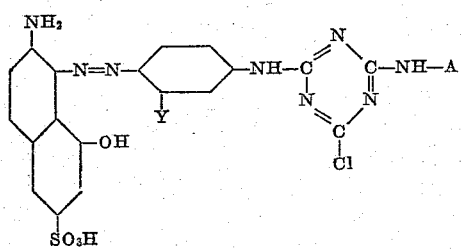

in which Y represents a sulfonic acid amide group, the nitrogen atom of which bears at most one hydrogen atom, and A represents a benzene radical, the dyestuff molecule containing the $SO_3H$ group shown in the said formula as sole free sulfonic acid group.

5. A monoazo dyestuff of the formula

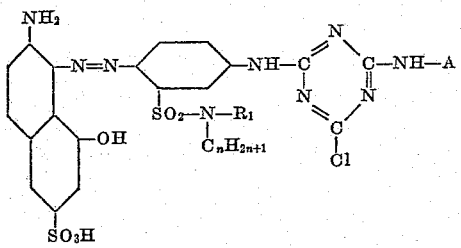

in which $R_1$ and A each represent a benzene radical free from water-solubilizing groups and $n$ represents a whole number up to 2.

6. A monoazo dyestuff of the formula

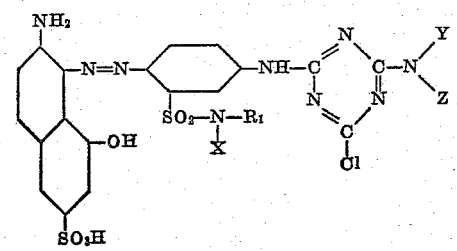

in which $R_1$ represents a benzene radical free from water-solubilizing groups and X, Y and Z each represent an alkyl radical of at most two carbon atoms.

7. The monoazo dyestuff of the formula

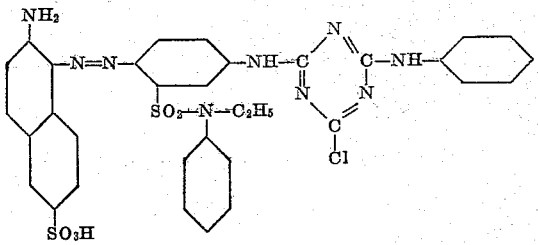

8. The monoazo dyestuff of the formula

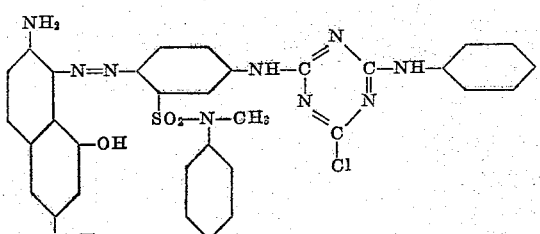

9. The monoazo dyestuff of the formula

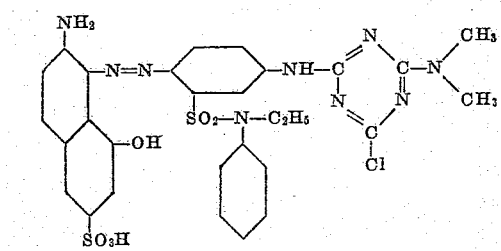

10. The monoazo dyestuff of the formula

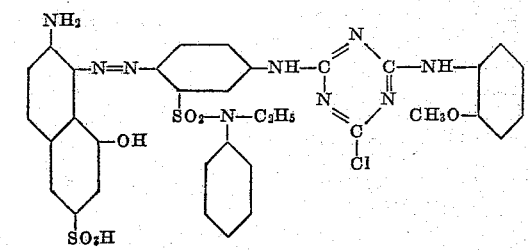

References Cited in the file of this patent
UNITED STATES PATENTS

| | | |
|---|---|---|
| 1,667,312 | Fritzsche et al. | Apr. 24, 1928 |
| 2,167,804 | Gubler et al. | Aug. 1, 1937 |